United States Patent
Zhao et al.

(10) Patent No.: US 12,468,463 B2
(45) Date of Patent: Nov. 11, 2025

(54) METHOD, DEVICE, AND COMPUTER PROGRAM PRODUCT FOR GARBAGE COLLECTION FOR STORAGE SYSTEM

(71) Applicant: Dell Products L.P., Round Rock, TX (US)

(72) Inventors: Chaojun Zhao, Chengdu (CN); Shuangshuang Liang, Zunyi (CN); Yang Zhang, Chengdu (CN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/667,685

(22) Filed: May 17, 2024

(65) Prior Publication Data
US 2025/0335113 A1    Oct. 30, 2025

(30) Foreign Application Priority Data
Apr. 25, 2024    (CN) .......................... 202410510995.X

(51) Int. Cl.
*G06F 3/06* (2006.01)

(52) U.S. Cl.
CPC ............ *G06F 3/064* (2013.01); *G06F 3/0608* (2013.01); *G06F 3/061* (2013.01); *G06F 3/0674* (2013.01)

(58) Field of Classification Search
CPC ........ G06F 3/064; G06F 3/0608; G06F 3/061; G06F 3/0674
See application file for complete search history.

(56) References Cited

U.S. PATENT DOCUMENTS

| | | | |
|---|---|---|---|
| 10,642,505 B1 * | 5/2020 | Kuzmin ................ | G06F 3/0679 |
| 2016/0092120 A1 * | 3/2016 | Liu ........................ | G06F 3/0629 |
| | | | 711/103 |
| 2016/0179386 A1 * | 6/2016 | Zhang .................... | G06F 3/061 |
| | | | 711/103 |
| 2019/0286556 A1 * | 9/2019 | You ...................... | G06F 12/0246 |
| 2020/0174668 A1 * | 6/2020 | Byun .................... | G06F 3/0604 |

(Continued)

OTHER PUBLICATIONS

P. R. Wilson, "Uniprocessor Garbage Collection Techniques," International Workshop on Memory Management, Sep. 1992, 67 pages.

(Continued)

*Primary Examiner* — Ryan Bertram
(74) *Attorney, Agent, or Firm* — Ryan, Mason & Lewis, LLP

(57) ABSTRACT

A method for garbage collection for a storage system in an illustrative embodiment includes determining input/output (IO) access popularity of a plurality of partially occupied unit blocks in response to receiving an instruction for garbage collection for the storage system. The method further includes selecting two unit blocks from the plurality of partially occupied unit blocks based on the utilization and the IO access popularity of the plurality of partially occupied unit blocks. In addition, the method further includes determining to fully release the two unit blocks or to partially release the two unit blocks based on the two unit blocks and a target block. In this manner, by considering the IO access popularity of the unit blocks, the less active unit blocks are merged as preferentially as possible, which reduces the probability of fragment jitter, thereby improving the efficiency of garbage collection.

20 Claims, 9 Drawing Sheets

(56) References Cited

U.S. PATENT DOCUMENTS

2022/0035735 A1* 2/2022 Bhardwaj ............ G06F 12/0246
2024/0045799 A1* 2/2024 Cariello .............. G06F 12/0246
2025/0028679 A1* 1/2025 Austruy ................ G06F 3/0643

OTHER PUBLICATIONS

Wikipedia, "Garbage Collection (computer science)," https://en.wikipedia.org/wiki/Garbage_collection_(computer_science), Apr. 24, 2024, 11 pages.

* cited by examiner

METHOD, DEVICE, AND COMPUTER PROGRAM PRODUCT FOR GARBAGE COLLECTION FOR STORAGE SYSTEM

RELATED APPLICATION

The present application claims priority to Chinese Patent Application No. 202410510995.X, filed Apr. 25, 2024, and entitled "Method, Device, and Computer Program Product for Garbage Collection for Storage System," which is incorporated by reference herein in its entirety.

FIELD

The present disclosure relates to the field of data storage and, more particularly, to a method, a device, and a computer program product for garbage collection for a storage system.

BACKGROUND

After a data protection system or other type of storage system has been used by a client for a long period of time, the allocated space will become fragmented, i.e., the space has many partially allocated blocks. These partially allocated blocks arise from overwrites, write requests of different sizes, and even some internal block movements. Voids in partially allocated blocks degrade the performance of the storage system and reduce the available space.

Garbage collection techniques are commonly used for defragmenting data protection systems and other types of storage systems (e.g., in file systems) and are widely used in the primary storage, secondary storage, and data protection industries. Some garbage collection techniques employ merging of a plurality of partially allocated blocks to return available space to the storage system.

SUMMARY

Embodiments of the present disclosure provide a method, a device, and a computer program product for garbage collection for a storage system.

According to a first aspect of embodiments of the present disclosure, a method for garbage collection for a storage system is provided. The method includes: determining input/output (IO) access popularity of a plurality of partially occupied unit blocks in response to receiving an instruction for garbage collection for the storage system; selecting two unit blocks from the plurality of partially occupied unit blocks based on the utilization and the IO access popularity of the plurality of partially occupied unit blocks; and determining to fully release the two unit blocks or to partially release the two unit blocks based on the two unit blocks and a target block.

According to a second aspect of embodiments of the present disclosure, an electronic device is provided. The electronic device includes at least one processor, and a memory coupled to the at least one processor and having instructions stored therein. The instructions, when executed by the at least one processor, cause the electronic device to perform actions including: determining IO access popularity of a plurality of partially occupied unit blocks in response to receiving an instruction for garbage collection for a storage system; selecting two unit blocks from the plurality of partially occupied unit blocks based on the utilization and the IO access popularity of the plurality of partially occupied unit blocks; and determining to fully release the two unit blocks or to partially release the two unit blocks based on the two unit blocks and a target block.

According to a third aspect of embodiments of the present disclosure, a computer program product is provided. The computer program product is tangibly stored on a non-transitory computer-readable medium and comprises machine-executable instructions. The machine-executable instructions, when executed by a machine, cause the machine to perform actions including: determining IO access popularity of a plurality of partially occupied unit blocks in response to receiving an instruction for garbage collection for a storage system; selecting two unit blocks from the plurality of partially occupied unit blocks based on the utilization and the IO access popularity of the plurality of partially occupied unit blocks; and determining to fully release the two unit blocks or to partially release the two unit blocks based on the two unit blocks and a target block.

It should be understood that the contents of this Summary are neither intended to limit key or essential features of embodiments of the present disclosure, nor intended to limit the scope of the present disclosure. Other features of the present disclosure will become readily understood from the additional description provided herein.

BRIEF DESCRIPTION OF THE DRAWINGS

The above and other features, advantages, and aspects of embodiments of the present disclosure will become more apparent with reference to the accompanying drawings and the Detailed Description below. In the accompanying drawings, the same or similar reference numerals represent the same or similar elements. In the accompanying drawings.

DETAILED DESCRIPTION

Figure 1:
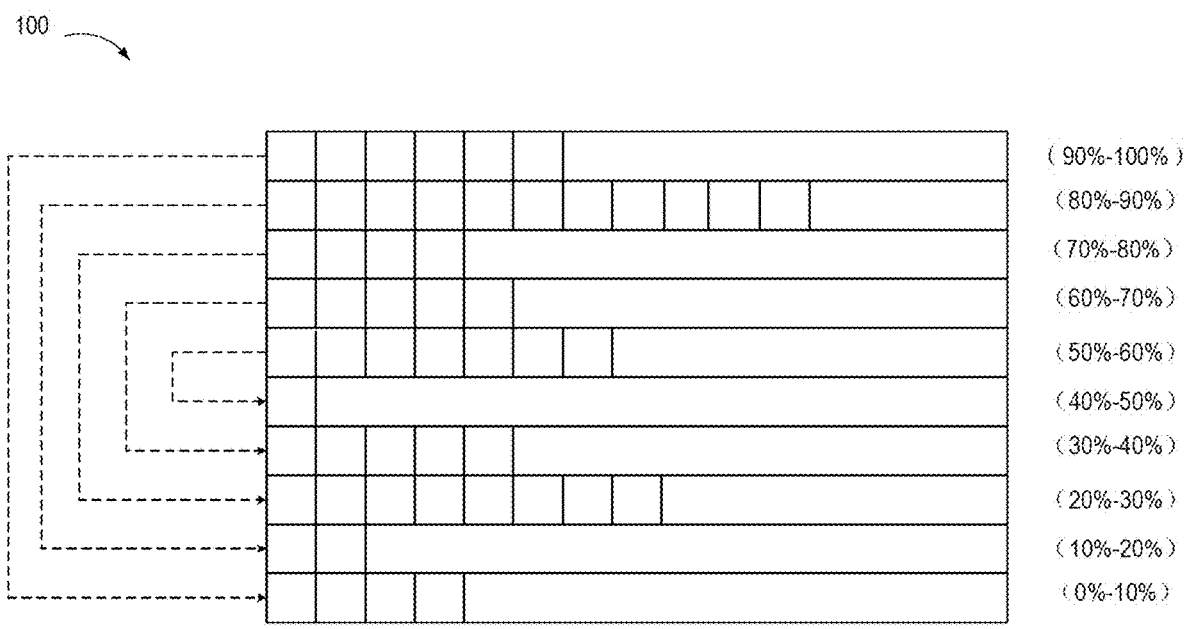
FIG. 1 is a schematic diagram of utilization queues and a corresponding pairing rule for unit blocks in current garbage collection.

Illustrative embodiments of the present disclosure will be described below in further detail with reference to the accompanying drawings. Although the accompanying drawings show some embodiments of the present disclosure, it should be understood that the present disclosure may be implemented in various forms, and should not be construed as being limited to the embodiments stated herein. Rather, these embodiments are provided for understanding the present disclosure more thoroughly and completely. It should be understood that the accompanying drawings and embodiments of the present disclosure are for illustrative purposes only, and are not intended to limit the scope of protection of the present disclosure.

In the description of embodiments of the present disclosure, the terms "include," "have," and similar terms thereof should be understood as open-ended inclusion, that is, "including but not limited to." The term "based on" should be understood as "based at least in part on." The terms "embodiment," "one embodiment," or "this embodiment" should be understood as "at least one embodiment."

After a data protection system or other type of storage system has been used by a client for a long period of time, the allocated space will become fragmented, i.e., the space has many partially allocated blocks. These partially allocated blocks arise from overwrites, write requests of different sizes, and even some internal block movements. Voids in partially allocated blocks degrade the performance of the storage system and reduce the available space, and this influence is exacerbated over time.

Fragments in the space can be cleaned up by employing one or more garbage collection techniques for the data protection system or other type of storage system. This cleanup illustratively involves pairing and merging partially allocated blocks according to their utilization, and then after the merging, clearing the data in the partially allocated blocks (also referred to later as "unit blocks," each of which can be, for example, 2 MB in size) in order to achieve the effect of releasing available space.

However, current garbage collection techniques often suffer from fragment jitter, i.e., when data from two highly active unit blocks are merged into a target block, the target block may quickly become fragmented again due to overwrites, write requests, and other operations. In addition, in the current garbage collection techniques, the merge cannot be executed if the sum of sizes of data in two unit blocks exceeds the size of the target block, thus reducing the probability that the unit blocks release space for the system.

To this end, the present disclosure provides a new strategy that reduces the probability of fragment jitter by considering the IO access popularity of unit blocks and merging the less active unit blocks as preferentially as possible, and determines, based on two unit blocks to be merged and a target block, to fully release or to partially release the two unit blocks, thereby improving the collection effect of the garbage collection, and providing more available space for the storage system.

FIG. 1 is a schematic diagram of utilization queues 100 and a corresponding pairing rule for unit blocks in current garbage collection. The square blocks in FIG. 1 represent unit blocks, the unit blocks in the same row belong to the same queue, and the utilization of storage space (hereinafter referred to as "utilization") of the unit blocks in the same queue falls within the same utilization range. In the embodiment shown in FIG. 1, the utilization is divided into ten intervals ranging from 0 to 100%, where a unit block in a queue in an interval of high utilization is paired with a unit block in a queue in an interval of low utilization for merging into a target block.

In the embodiment shown in FIG. 1, the sum of the maximum value of an interval of high utilization and the minimum value of an interval of low utilization is 100%. For example, unit blocks with utilization in the 90%-100% interval are paired with unit blocks with utilization in the 0-10% interval, unit blocks with utilization in the 80%-90% interval are paired with unit blocks with utilization in the 10%-20% interval, unit blocks with utilization in the 70%-80% interval are paired with unit blocks with utilization in the 20%-30% interval, unit blocks with utilization in the 60%-70% interval are paired with unit blocks with utilization in the 30%-40% interval, and unit blocks with utilization in the 50%-60% interval are paired with unit blocks with utilization in the 40%-50% interval. In this way, the utilization of the target block can be made as close to 100% as possible.

Figure 2:
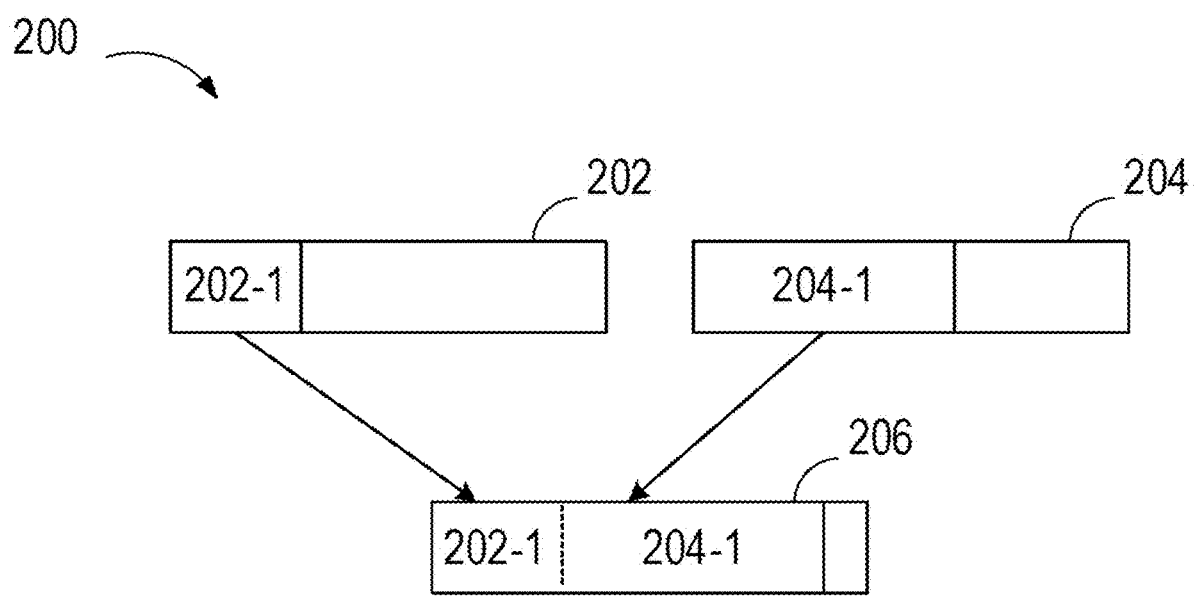
FIG. 2 is a schematic diagram of a merge operation for unit blocks in the current garbage collection.

FIG. 2 is a schematic diagram of a merge operation 200 for unit blocks in the current garbage collection. As shown in FIG. 2, the merge operation 200 includes separately moving data 202-1 in a unit block 202 and data 204-1 in a unit block 204 that satisfy the pairing rule shown in FIG. 1 to a target block 206, and then the space of the unit block 202 and the unit block 204 can be released. However, when the sum of sizes of the data 202-1 and the data 204-1 is greater than the size of the target block 206, the merge operation 200 cannot be performed, which reduces the opportunity for the unit blocks to release space for the system. In addition, if one or both of the data 202-1 and the data 204-1 will be accessed frequently, they will quickly become fragmented even if they are merged into the target block 206 by the merge operation 200, which negatively affects the storage system performance and the storage system capacity and efficiency.

Figure 3:
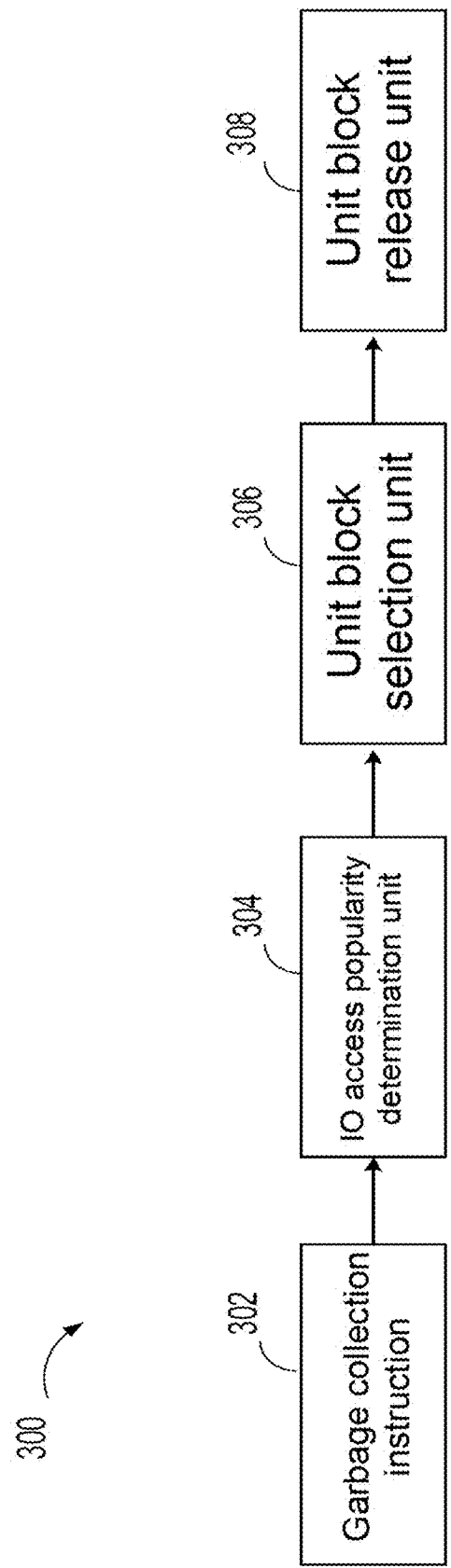
FIG. 3 is a schematic diagram of an environment for implementing the overall design of embodiments of the present disclosure.

FIG. 3 is a schematic diagram of an environment 300 for implementing the overall design of embodiments of the present disclosure. As shown in FIG. 3, the environment 300 includes a garbage collection instruction 302, an IO access popularity determination unit 304, a unit block selection unit 306, and a unit block release unit 308.

In response to the garbage collection instruction 302, the IO access popularity determination unit 304 determines IO access popularity of a plurality of unit blocks. This IO access popularity can measure an overall access activity level of data in a unit block, and the higher the IO access popularity is, the higher the access activity level is, which means that the merged target block is more unstable.

Based on the IO access popularity determined by the IO access popularity determination unit 304 and the utilization of unit blocks, two unit blocks satisfying the pairing rule shown in FIG. 1 are selected by the unit block selection unit 306. These two selected unit blocks are the unit blocks with the lowest IO access popularity in the respective queues, so that a merge operation of the unit blocks with low access activity level can be prioritized, and the probability of fragment jitter can be reduced.

Based on the two unit blocks selected by the unit block selection unit 306 and the target block, full space release or partial space release is performed on the two unit blocks by the unit block release unit 308. The unit block release unit 308 compares a sum of sizes of data in the two unit blocks with the size of the target block, and if the sum of sizes of data in the two unit blocks is less than or equal to the size of the target block, space release is performed on both the two unit blocks; and if the sum of sizes of data in the two unit blocks is greater than the size of the target block, all the space of the unit block with lower IO access popularity is released, and part of the space of the unit block with higher IO access popularity is released.

In this manner, by prioritizing the merging of the unit blocks with low IO access popularity, the probability of fragment jitter is reduced, and by partially releasing two unit blocks of which the sum of sizes of data is greater than the size of the target block, the probability that the unit blocks release space for the system is increased, thereby saving space more effectively.

Figure 4:
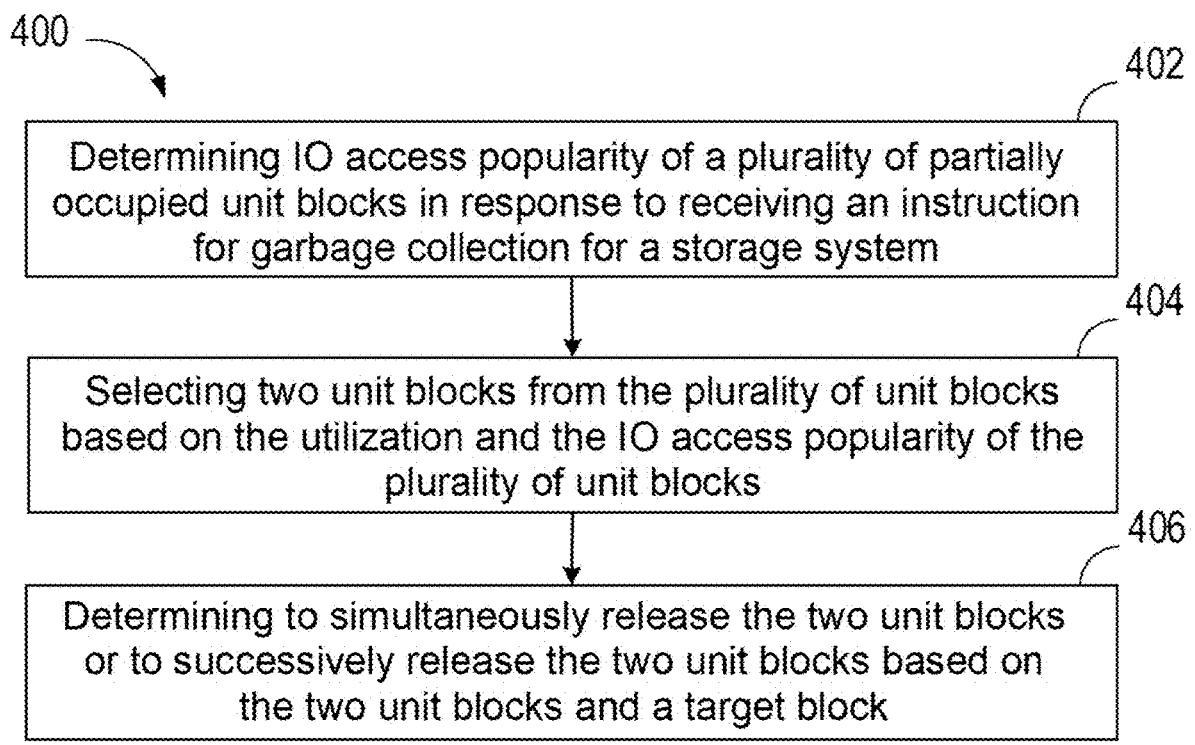
FIG. 4 is a flow chart of a method for garbage collection for a storage system according to some embodiments of the present disclosure.

FIG. 4 is a flow chart of a method 400 for garbage collection for a storage system according to some embodiments of the present disclosure. The method 400 may be executed in the environment 300 shown in FIG. 3. Furthermore, the numbering in the flow chart does not indicate the order in which these steps are executed, and some of or all these steps may be executed in parallel, or the execution order can be reversed, which is not limited in the present disclosure.

At block 402, in response to receiving an instruction for garbage collection for a storage system, IO access popularity of a plurality of partially occupied unit blocks is determined. In some embodiments, in response to receiving the garbage collection instruction 302 for the storage system, the IO access popularity of the plurality of partially occupied unit blocks is determined by the IO access popularity determination unit 304. Determining the IO access popularity of the plurality of unit blocks includes determining IO access popularity of a unit logic space; and determining the IO access popularity of the unit blocks based on the IO access popularity of the unit logic space and the size of data in the unit logic space after being compressed. In the logical space, data is stored in an easy-to-understand logical relationship, usually organized in the form of directories and files.

At block 404, two unit blocks are selected from the plurality of unit blocks based on the utilization and the IO access popularity of the plurality of unit blocks. In some embodiments, two unit blocks satisfying the pairing rule shown in FIG. 1 are selected by the unit block selection unit 306 based on the utilization and the IO access popularity of the plurality of unit blocks. The IO access popularity of the selected two unit blocks is the lowest in their respective queues.

At block 406, based on the two unit blocks and a target block, it is determined to fully release (e.g., simultaneously release) the two unit blocks or to partially release (e.g., successively release) the two unit blocks. In some embodiments, based on a comparison between the sum of sizes of data in the two unit blocks with the size of the target block, full release or partial release of the two unit blocks is performed by the unit block release unit 308. The execution process of the full release includes: in response to the sum of sizes of data in the two unit blocks being less than or equal to the size of the target block, copying all the data in the two unit blocks to the target block, and deleting all the data in the two unit blocks. The execution process of the partial release includes: in response to the sum of sizes of data in the two unit blocks being greater than the size of the target block, copying all of the data in a unit block with lower IO access popularity to the target block and deleting all of the data in that unit block; and copying a part of the data in a unit block with higher IO access popularity to the target block and deleting that part of the data in that unit block.

Figure 7:
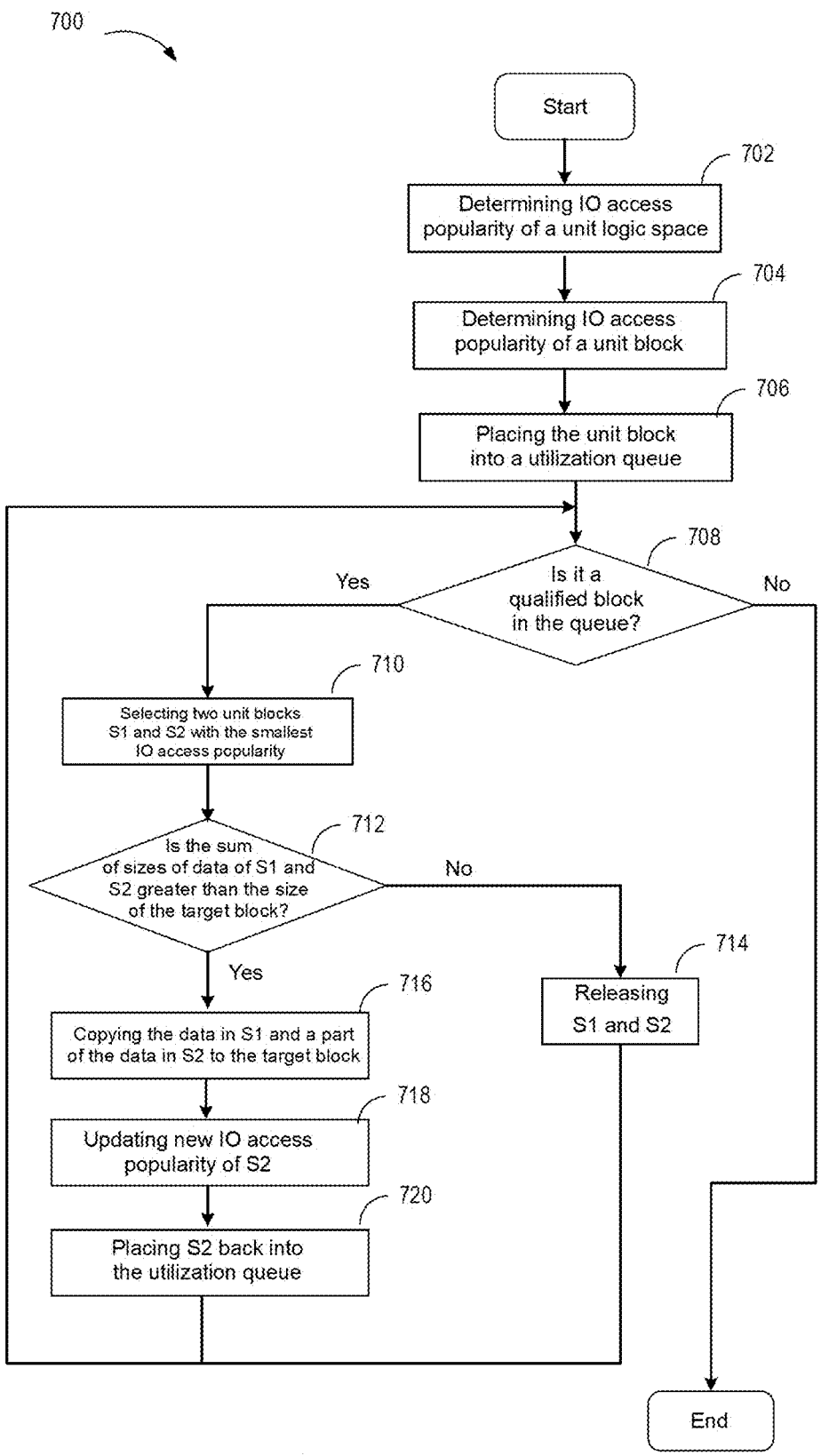
FIG. 7 is a flow chart of another method for garbage collection for a storage system according to some embodiments of the present disclosure.

As described above, FIG. 4 depicts an overall execution process of a method for garbage collection for a storage system. The execution process of another method for garbage collection for a storage system is described below in conjunction with FIG. 7. FIG. 7 is a flow chart of another method 700 for garbage collection for a storage system according to some embodiments of the present disclosure. The method 700 may be executed in the environment 300 shown in FIG. 3. Furthermore, the numbering in the flow chart does not indicate the order in which these steps are executed, and some of or all these steps may be executed in parallel, or the execution order can be reversed, which is not limited in the present disclosure.

At block 702, IO access popularity of a unit logic space is determined. In some embodiments, data in a unit block comes from different logic space addresses. For example, data in a log file is accessed frequently and has high IO access popularity, whereas data close to a root is rarely accessed after it is written and thus has low IO access popularity. Therefore, in order to determine the overall IO access popularity of a unit block, some embodiments first determine the IO access popularity of each unit logic space in the unit block. In an embodiment of the present disclosure, the size of the unit logic space is 2 GB. In order to measure the activity level of a unit logic space, an IO at the current time is allowed to have the greatest impact, while an IO with a long history has less and less impact on the unit logic space as the elapsed time increases, and an exponential moving average method is used to calculate the IO access popularity at the current time. In this way, the IO access popularity of a unit logic space at the current time can be calculated by the following Equation (1):

$$D_n = I_n \times \left(1 - e^{-\lambda \Delta t}\right) + D_{n-1} \times e^{-\lambda \Delta t} \qquad (1)$$

where $D_n$ denotes the IO access popularity of the unit logic space at the current time, $I_n$ indicates an IO count at the current time, $\Delta t$ denotes a sampling time of the record of the IO count, $D_{n-1}$ denotes the IO access popularity of the unit logic space prior to $\Delta t$, and $\lambda$ is an adjustable attenuation coefficient, which is a constant, and the value of which is determined according to statistics or experience.

At block 704, IO access popularity of a unit block is determined. In some embodiments, data goes through a data compression process before being cached from a cache to the unit block. Although the sizes of data in different unit logic spaces are the same in the cache, the data in different unit logic spaces after undergoing data compression becomes different in size, as shown in Table 1, due to the fact that the compression ratios of different data may also be different. In Table 1, data blocks represent data in different unit logic spaces.

TABLE 1

Relevant information of each unit block

| Data block ID | IO access popularity | Size after compression |
|---|---|---|
| Data block-1 | D1 | CS1 |
| Data block-2 | D2 | CS2 |
| Data block-3 | D3 | CS3 |
| ... | ... | ... |
| Data block-m | Dm | CSm |

According to Table 1, the IO access popularity of a unit block can be inferred by the following Equation (2):

$$D_p \times \sum_{i=1}^{m} CS_i = \sum_{i=1}^{m} D_i \times CS_i \qquad (2)$$

where $D_p$ denotes the IO access popularity of the unit block, m denotes the number of unit logic spaces in the unit block, $D_i$ denotes the IO access popularity of the ith unit logic space, and $CS_i$ denotes the size of the data in the ith unit logic space after compression. Equation (2) may be viewed as relating in some respects to "conservation of heat," i.e., before and after the compression, the total IO access popularity of all data in the unit block is equal. By solving Equation (2), the IO access popularity $D_p$ of the unit block is expressed in Equation (3) as follows:

$$D_p = \frac{\sum_{i=1}^{m} D_i \times CS_i}{\sum_{i=1}^{m} CS_i} \quad (3)$$

The determination of the IO access popularity of the unit block in some embodiments is therefore realized by Equation (3).

At block 706, the unit block is placed into a utilization queue. In some embodiments, unit blocks are placed in different utilization queues depending on the utilization of the unit blocks, and unit blocks are ranked in a queue in ascending order of IO access popularity based on the IO access popularity of the unit blocks, and the unit block at the head of the queue is the unit block with the lowest IO access popularity.

Figure 5:
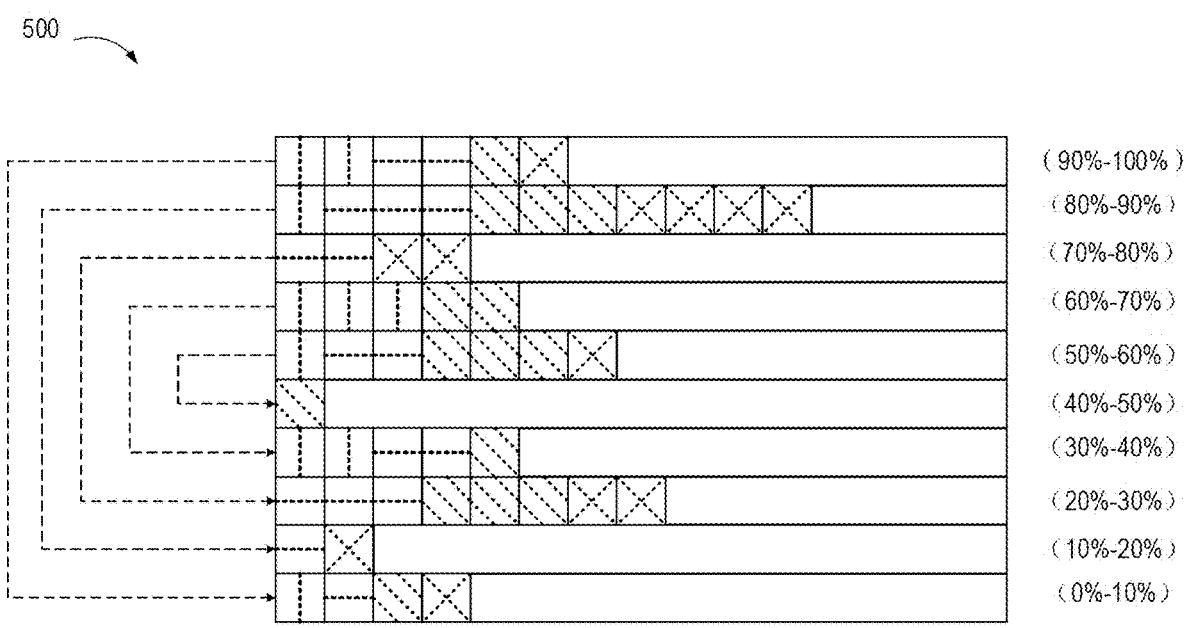
FIG. 5 is a schematic diagram of utilization queues and a corresponding pairing rule for unit blocks in garbage collection according to some embodiments of the present disclosure.

Referring now to FIG. 5, a schematic diagram of utilization queues 500 and a corresponding pairing rule for unit blocks in garbage collection according to some embodiments of the present disclosure is shown. As can be seen, the pairing rule still follows the rule shown in FIG. 1, with the difference being that a distinction is made between unit blocks. Square blocks with different stripes represent different IO access popularity, where vertical dashed stripes represent the lowest IO access popularity, horizontal dashed stripes represent low IO access popularity, diagonal dashed stripes represent high IO access popularity, and cross dashed stripes represent the highest IO access popularity. By placing unit blocks with low IO access popularity at the front of a queue, the merging of less active data can be prioritized, and the probability of fragment jitter can be reduced.

At block 708, a determination is made as to whether a unit block coming out of the queue is a unit block that meets a condition. In some embodiments, the condition may be whether the IO access popularity of the unit block does not exceed a certain threshold. If the IO access popularity of the unit block exceeds the threshold, the unit block is a unit block that does not meet the condition, and the garbage collection process is ended. If the unit block is a unit block that meets the condition, the process proceeds to block 710.

At block 710, two unit blocks S1 and S2 with the smallest IO access popularity are selected. In some embodiments, one unit block at the head of the queue is selected separately from two queues that meet the pairing rule as shown in FIG. 1 or FIG. 5, and the process proceeds to block 712.

At block 712, the sum of sizes of data of the two unit blocks is compared with the size of the target block, and if the sum of sizes of data of the two unit blocks is not greater than the size of the target block, the process proceeds to block 714; if the sum of sizes of data of the two unit blocks is greater than the size of the target block, the process proceeds to block 716.

At block 714, full space release is performed on the unit blocks S1 and S2. In some embodiments, the full release of the unit blocks S1 and S2 includes copying all the data in them to the target block and deleting all the data in them. As a result, space in the unit blocks S1 and S2 becomes available, thereby increasing the available space in the storage system.

At block 716, assuming that the IO access popularity of the unit block S1 is lower than the IO access popularity of the unit block S2, all the data in the unit block S1 is copied to the target block, a part of the data in S2 is copied to the target block. This copying process would be reversed if the IO access popularity of the unit block S2 were lower than the IO access popularity of the unit block S1, that is, in that scenario, all of the data is S2 would be copied to the target block and only a part of the data in S1 would be copied to the target block.

Figure 6:
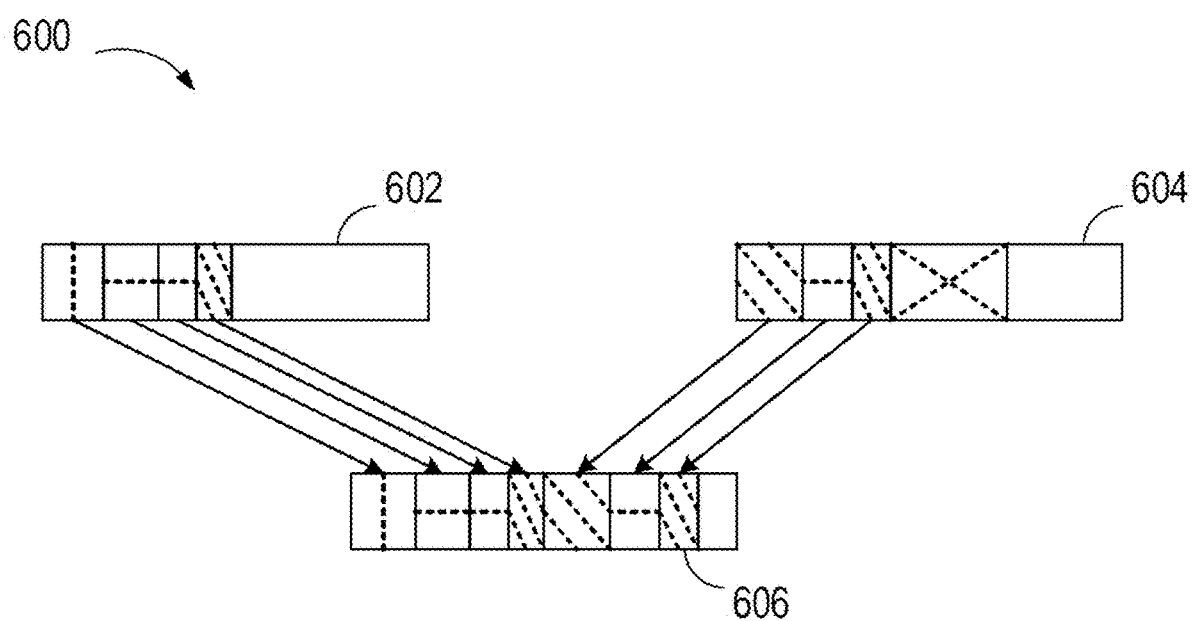
FIG. 6 is a schematic diagram of a merge operation for unit blocks in garbage collection according to some embodiments of the present disclosure.

The process of block 716 is now described in conjunction with FIG. 6, and FIG. 6 is a schematic diagram of a merge operation 600 for unit blocks in garbage collection according to some embodiments of the present disclosure. It is assumed that the IO access popularity of a unit block 602 (corresponding to the unit block S1) is lower than the IO access popularity of a unit block 604 (corresponding to the unit block S2), and the sum of the size of data in the unit block 602 and the size of data in the unit block 604 is greater than the size of a target block 606. Then, all the data in the unit block 602 is copied to the target block 606, and a part of the data in the unit block 604 is copied to the target block 606, so as to make the utilization of the target block 606 as close to 100% as possible. The part of the data in the unit block 604 that is copied to the target block is the data with low IO access popularity. Then, all the data in the unit block 602 is deleted, and the data in the unit block 604 that is copied to the target block is deleted, leaving the data with high IO access popularity. In this way, the space release of one of the two unit blocks can be realized, which avoids the inability to perform the operation of merging to the target block when the sum of sizes of data of the two unit blocks exceeds the size of the target block, and improves the effectiveness of garbage collection.

At block 718, new IO access popularity of the unit block S2 is updated. In some embodiments, after the unit block S2 has gone through the process of block 716, the IO access popularity and the size of the data contained therein are different from before, its IO access popularity is recalculated according to Equation (3), and its utilization is redetermined as well.

At block 720, the unit block S2 is placed back into the utilization queue. In some embodiments, the unit block S2 may be placed back into its original queue or it may be placed into another queue, depending on its current utilization. The unit block S2 may be placed at the head of the queue or in the middle of the queue, depending on the comparison between its IO access popularity with the IO access popularity of the other unit blocks in the queue. When the unit block S2 is in the middle of the queue, its IO access popularity is greater than the IO access popularity of unit blocks in front of it and less than the IO access popularity of unit blocks behind it. After the unit block S2 has been placed, the process returns to block 708 so that the garbage collection process can be continually performed and the same unit block can also be merged into the target block more than once during the process, thus saving space more effectively.

Figure 8:
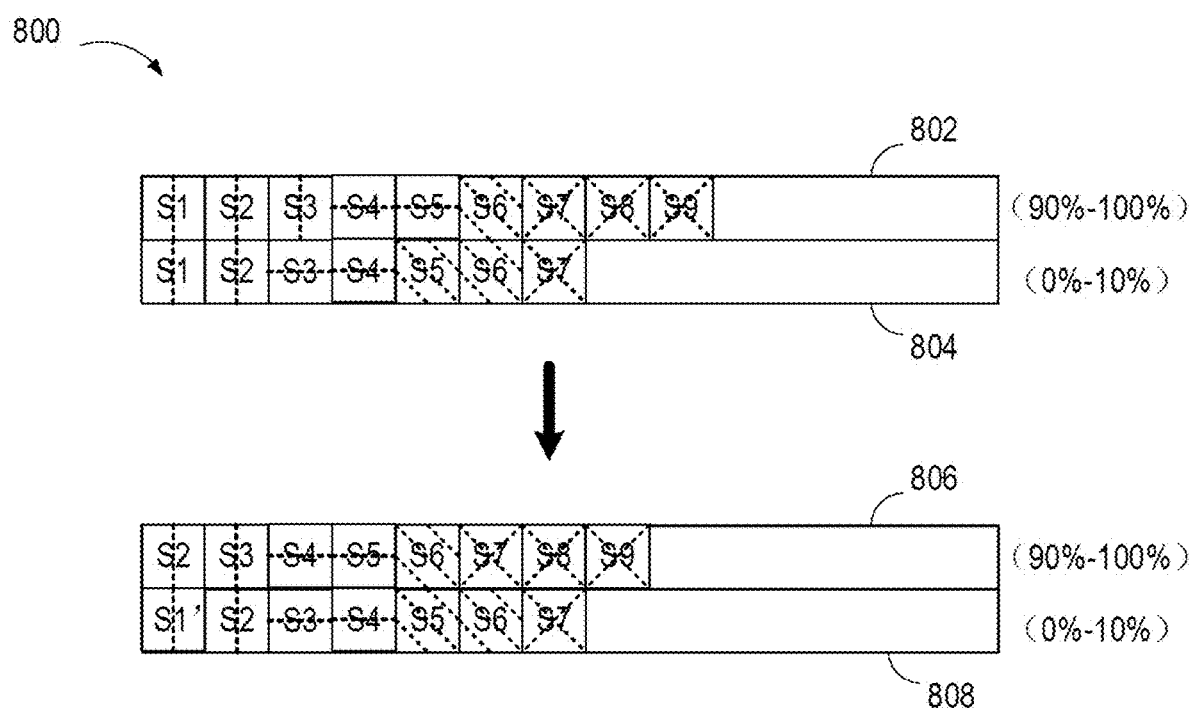
FIG. 8 is a schematic diagram of utilization queues before and after merging in a situation where the sum of sizes of data in two unit blocks is greater than the size of a target block according to some embodiments of the present disclosure.

FIG. 8 is a schematic diagram of utilization queues 800 before and after merging in a situation where the sum of sizes of data in two unit blocks is greater than the size of a target block according to some embodiments of the present disclosure. As shown in FIG. 8, two queues at the top of FIG. 8 each contain unit blocks (denoted by S1, S2, . . . , and SN)

with different IO access popularity, where unit blocks in each of the queues are arranged in ascending order of IO access popularity, and when a merge operation is performed, the unit block S1 with the smallest IO access popularity in the queue 802 and the unit block S1 with the smallest IO access popularity in the queue 804 are the first to come out of the queues. Accordingly, the merge operation in this embodiment involves the unit block S1 in the queue 802 and the unit block S1 in the queue 804. After the merge operation is performed, the space in the unit block S1 from the queue 802 is released in its entirety, and the queue 802 is changed to the queue 806, where S2 is ranked at the head of the queue and waits for the next merge operation. The unit block S1 from the queue 804 becomes S1' after part of the data in the unit block S1 from the queue 804 is deleted. Since the utilization is still in the range of 0 to 10% and its IO access popularity is still the lowest compared with that of the other unit blocks in the queue 804, it is placed at the head of the queue 808 and, at the next merge operation, will come out of the queue at the same time as S2 in the queue 806 for merging.

Figure 9:
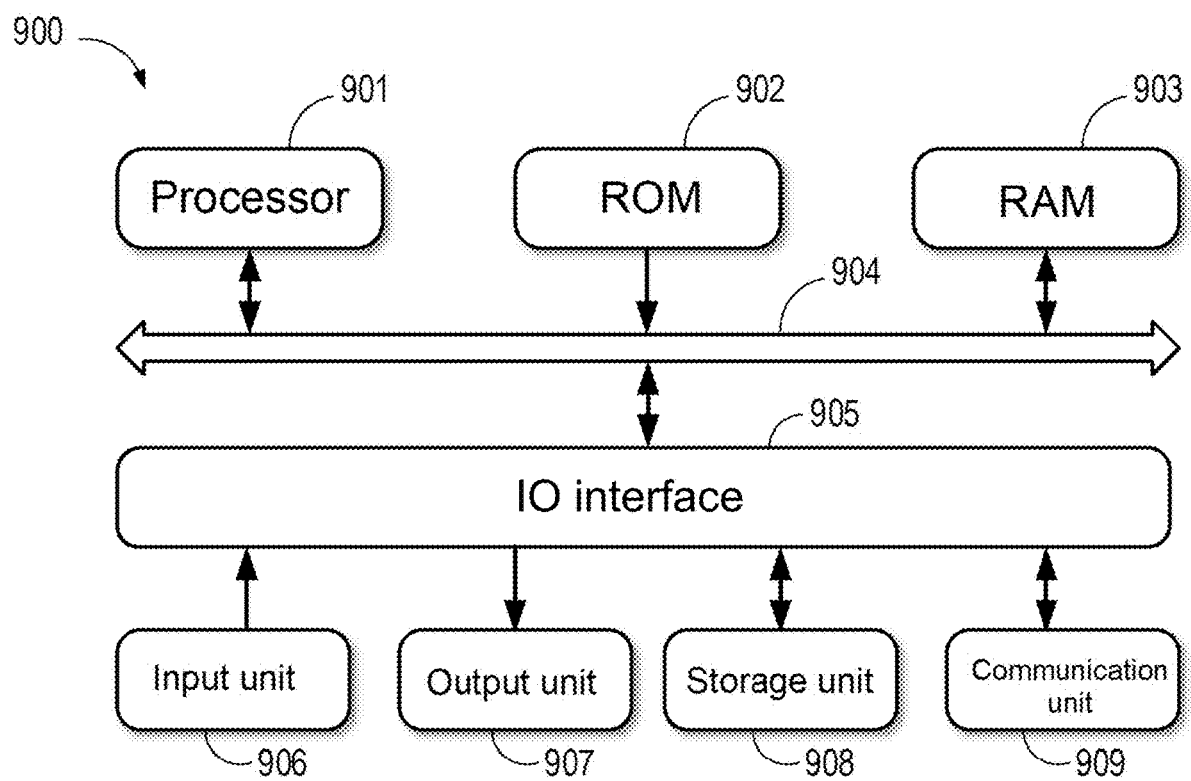
FIG. 9 is a block diagram of an example device suitable for implementing embodiments of the present disclosure.

FIG. 9 is a block diagram of an example device 900, which may be viewed as an example of what is also referred to herein as an electronic device. The device 900 can be used to implement embodiments of the present disclosure. As shown in the figure, the device 900 includes a processor 901 that can execute various appropriate actions and processing according to computer program instructions stored in a read-only memory (ROM) 902 or computer program instructions loaded from a storage unit 908 into a random access memory (RAM) 903. Various programs and data required for the operation of the device 900 may also be stored in the RAM 903. The processor 901, the ROM 902, and the RAM 903 are connected to each other through a bus 904. An IO interface 905 is also connected to the bus 904.

A plurality of components in the device 900 are connected to the IO interface 905 and include: an input unit 906, such as a keyboard and a mouse; an output unit 907, such as various types of displays and speakers; the storage unit 908, such as a magnetic disk and an optical disc; and a communication unit 909, such as a network card, a modem, and a wireless communication transceiver. The communication unit 909 allows the device 900 to exchange information/data with other devices via a computer network, such as the Internet, and/or various telecommunication networks.

The processor 901 may be a variety of general-purpose and/or specialized processing components with processing and computing capabilities. Some examples of the processor 901 include, but are not limited to, central processing units (CPUs), graphics processing units (GPUs), various specialized artificial intelligence (AI) computing chips, various processors running machine learning model algorithms, digital signal processors (DSPs), and any suitable processors, controllers, microcontrollers, or the like. The processor 901 performs the various methods and processing described above, such as the method 400. For example, in some embodiments, the method 400 may be implemented as a computer software program that is tangibly included in a machine-readable medium, such as the storage unit 908. In some embodiments, part or all of the computer program may be loaded and/or installed onto the device 900 via the ROM 902 and/or the communication unit 909. When the computer program is loaded into the RAM 903 and executed by the processor 901, one or more steps of the method 400 described above may be performed. Alternatively, in other embodiments, the processor 901 may be configured to perform the method 400 by any other suitable means (e.g., with the aid of firmware).

The functions described herein may be executed at least in part by one or more hardware logic components. For example, without limitation, example types of available hardware logic components include: a Field Programmable Gate Array (FPGA), an Application Specific Integrated Circuit (ASIC), an Application Specific Standard Product (ASSP), a System on Chip (SOC), a Complex Programmable Logic Device (CPLD), and the like.

Program codes for implementing the method of the present disclosure may be written by using one programming language or any combination of multiple programming languages. The program code may be provided to a processor or controller of a general purpose computer, a special purpose computer, or another programmable data processing apparatus, such that the program code, when executed by the processor or controller, implements the functions/operations specified in the flow charts and/or block diagrams. The program code may be executed completely on a machine, executed partially on a machine, executed partially on a machine and partially on a remote machine as a stand-alone software package, or executed completely on a remote machine or server.

In the context of the present disclosure, a machine-readable medium may be a tangible medium that may include or store a program for use by an instruction execution system, apparatus, or device or in connection with the instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination of the above content. More specific examples of the machine-readable storage medium may include one or more wire-based electrical connections, a portable computer diskette, a hard disk, a RAM, a ROM, an erasable programmable read-only memory (EPROM or flash memory), an optical fiber, a portable compact disc read-only memory (CD-ROM), an optical storage device, a magnetic storage device, or any suitable combinations thereof. Additionally, although operations are depicted in a particular order, this should not be construed as an indication that such operations are required to be performed in the particular order shown or in a sequential order, or that all illustrated operations should be performed to achieve desirable results. Under certain environments, multitasking and parallel processing may be advantageous. Likewise, although the above discussion contains several specific implementation details, these should not be construed as limitations to the scope of the present disclosure. Certain features that are described in the context of separate embodiments may also be implemented in combination in a single implementation. Conversely, various features that are described in the context of a single implementation may also be implemented in a plurality of implementations separately or in any suitable sub-combination.

Although the present subject matter has been described using a language specific to structural features and/or method logical actions, it should be understood that the subject matter defined in the appended claims is not necessarily limited to the particular features or actions described above. Rather, the specific features and actions described above are merely example forms of implementing the claims.

What is claimed is:

1. A method for garbage collection for a storage system, the method comprising:
   determining input/output (IO) access popularity of a plurality of partially occupied unit blocks in response to receiving an instruction for garbage collection for the storage system;
   selecting two unit blocks from the plurality of partially occupied unit blocks based on utilization and the IO access popularity of the plurality of partially occupied unit blocks; and
   determining to fully release the two unit blocks or to partially release the two unit blocks based on the two unit blocks and a target block;
   wherein determining IO access popularity of a plurality of partially occupied unit blocks comprises:
   determining IO access popularity of a unit logic space; and
   determining the IO access popularity of the partially occupied unit blocks based on the IO access popularity of the unit logic space and a size of data in the unit logic space after being compressed.

2. The method according to claim 1, wherein determining IO access popularity of a unit logic space comprises:
   determining IO access popularity of the unit logic space at a current time based on an IO count of the unit logic space at the current time, a sampling time of a record of the IO count, IO access popularity of the unit logic space prior to the sampling time, and an adjustable attenuation coefficient.

3. The method according to claim 2, wherein the IO access popularity of the unit logic space at the current time is determined by an exponential moving average method.

4. The method according to claim 1, wherein determining to fully release the two unit blocks or to partially release the two unit blocks based on the two unit blocks and a target block comprises:
   fully releasing the two unit blocks in response to a sum of sizes of data in the two unit blocks being less than or equal to a size of the target block; or
   partially releasing the two unit blocks in response to a sum of sizes of data in the two unit blocks being greater than the size of the target block.

5. The method according to claim 1, wherein fully releasing the two unit blocks comprises:
   copying all the data in the two unit blocks to the target block; and
   deleting all the data in the two unit blocks.

6. The method according to claim 1, wherein partially releasing the two unit blocks comprises:
   copying all the data in a first unit block to the target block;
   deleting all the data in the first unit block;
   copying a part of the data in a second unit block to the target block; and
   deleting the part of the data in the second unit block,
   wherein IO access popularity of the first unit block is lower than IO access popularity of the second unit block.

7. The method according to claim 6, wherein IO access popularity of the part of the data is lower than IO access popularity of the remaining part of the data in the second unit block.

8. The method according to claim 6, wherein partially releasing the two unit blocks further comprises:
   determining new IO access popularity of the second unit block in response to the part of the data being deleted; and
   placing the second unit block into a corresponding utilization queue based on the new IO access popularity.

9. The method according to claim 8, wherein each queue in the utilization queue comprises unit blocks within the same utilization range, and the unit blocks are ranked in each queue in order of IO access popularity, with a unit block having the smallest IO access popularity being ranked at the head of the utilization queue.

10. An electronic device, comprising:
    at least one processor; and
    memory coupled to the at least one processor and having instructions stored therein, wherein the instructions, when executed by the at least one processor, cause the electronic device to perform actions comprising:
    determining input/output (IO) access popularity of a plurality of partially occupied unit blocks in response to receiving an instruction for garbage collection for a storage system;
    selecting two unit blocks from the plurality of partially occupied unit blocks based on utilization and the IO access popularity of the plurality of partially occupied unit blocks; and
    determining to fully release the two unit blocks or to partially release the two unit blocks based on the two unit blocks and a target block;
    wherein determining IO access popularity of a plurality of partially occupied unit blocks comprises:
    determining IO access popularity of a unit logic space; and
    determining the IO access popularity of the partially occupied unit blocks based on the IO access popularity of the unit logic space and a size of data in the unit logic space after being compressed.

11. The electronic device according to claim 10, wherein determining IO access popularity of a unit logic space comprises:
    determining IO access popularity of the unit logic space at a current time based on an IO count of the unit logic space at the current time, a sampling time of a record of the IO count, IO access popularity of the unit logic space prior to the sampling time, and an adjustable attenuation coefficient.

12. The electronic device according to claim 11, wherein the IO access popularity of the unit logic space at the current time is determined by an exponential moving average method.

13. The electronic device according to claim 10, wherein determining to fully release the two unit blocks or to partially release the two unit blocks based on the two unit blocks and a target block comprises:
    fully releasing the two unit blocks in response to a sum of sizes of data in the two unit blocks being less than or equal to a size of the target block; or
    partially releasing the two unit blocks in response to a sum of sizes of data in the two unit blocks being greater than the size of the target block.

14. The electronic device according to claim 10, wherein fully releasing the two unit blocks comprises:
    copying all the data in the two unit blocks to the target block; and
    deleting all the data in the two unit blocks.

15. The electronic device according to claim 10, wherein partially releasing the two unit blocks comprises:
    copying all the data in a first unit block to the target block;
    deleting all the data in the first unit block;
    copying a part of the data in a second unit block to the target block; and deleting the part of the data in the second unit block,
wherein IO access popularity of the first unit block is lower than IO access popularity of the second unit block.

16. The electronic device according to claim 15, wherein IO access popularity of the part of the data is lower than IO access popularity of the remaining part of the data in the second unit block.

17. The electronic device according to claim 15, wherein partially releasing the two unit blocks further comprises:
   determining new IO access popularity of the second unit block in response to the part of the data being deleted; and
   placing the second unit block into a corresponding utilization queue based on the new IO access popularity.

18. A computer program product, the computer program product being tangibly stored on a non-transitory computer-readable medium and comprising machine-executable instructions, wherein the machine-executable instructions, when executed by a machine, cause the machine to perform actions comprising:
   determining input/output (IO) access popularity of a plurality of partially occupied unit blocks in response to receiving an instruction for garbage collection for a storage system;
   selecting two unit blocks from the plurality of partially occupied unit blocks based on utilization and the IO access popularity of the plurality of partially occupied unit blocks; and
   determining to fully release the two unit blocks or to partially release the two unit blocks based on the two unit blocks and a target block;
   wherein determining IO access popularity of a plurality of partially occupied unit blocks comprises:
   determining IO access popularity of a unit logic space; and
   determining the IO access popularity of the partially occupied unit blocks based on the IO access popularity of the unit logic space and a size of data in the unit logic space after being compressed.

19. The computer program product according to claim 18, wherein determining IO access popularity of a unit logic space comprises:
   determining IO access popularity of the unit logic space at a current time based on an IO count of the unit logic space at the current time, a sampling time of a record of the IO count, IO access popularity of the unit logic space prior to the sampling time, and an adjustable attenuation coefficient.

20. The computer program product according to claim 18, wherein partially releasing the two unit blocks comprises:
   copying all the data in a first unit block to the target block;
   deleting all the data in the first unit block;
   copying a part of the data in a second unit block to the target block; and
   deleting the part of the data in the second unit block,
   wherein IO access popularity of the first unit block is lower than IO access popularity of the second unit block.

* * * * *